United States Patent [19]

Erlandsson et al.

[11] Patent Number: 4,651,654
[45] Date of Patent: Mar. 24, 1987

[54] INCINERATOR

[75] Inventors: Kjell I. Erlandsson; Mark A. DiFonzo, both of Milwaukee, Wis.; Peter Howald, Trimmis, Switzerland

[73] Assignee: Aqua-Chem, Inc., Milwaukee, Wis.

[21] Appl. No.: 664,402

[22] Filed: Oct. 24, 1984

[51] Int. Cl.⁴ .......................... F23G 5/00; F23G 5/12; F23G 5/44; F23G 7/00
[52] U.S. Cl. ................................. 110/254; 110/302; 431/167
[58] Field of Search ................. 110/254, 302; 431/167

[56] References Cited

U.S. PATENT DOCUMENTS

| | | |
|---|---|---|
| 1,240,295 | 9/1917 | Atterbury et al. |
| 3,746,521 | 7/1973 | Giddings ............................ 48/111 |
| 3,749,031 | 7/1973 | Burden, Jr. ........................ 110/8 |
| 3,766,866 | 10/1973 | Krumm ............................. 110/8 |
| 3,855,950 | 12/1974 | Hughes, Jr. et al. ................ 110/8 |
| 4,074,638 | 2/1977 | Miller .............................. 110/8 |
| 4,470,358 | 9/1984 | Prochnow ...................... 110/254 X |
| 4,545,306 | 10/1985 | Wolfram ....................... 110/254 X |

OTHER PUBLICATIONS

ECP Incinerator, "The Energy System".
Smokatrol Incinerators, "Pollution-Free, On-Site Waste Disposal Systems . . . ".
Econo-Therm, "The Powersavers Hospital Energy Recovery Systems".
Consumat Systems Inc., "Energy From Waste".
Waste Combustion Corp., "Waste Handling & Ash Removal Accessory Systems".
Consumat Systems Inc., Comtro Div. of Sunbeam Equipment Cor., "Super Systems".

Primary Examiner—Edward G. Favors
Attorney, Agent, or Firm—John C. Cooper, III; Fred Wiviott

[57] ABSTRACT

An incinerator for burning waste material includes an outer steel housing having a refractory liner that defines a combustion chamber. A series of channels are secured to the inner surface of the housing and provide vertical air flow passages. The lower ends of the passages are open to the atmosphere, while the upper ends are connected to a plenum and air is drawn through the passages by a blower to thereby preheat the air and cool the outer housing. A portion of the preheated air is directed to the stack for secondary combustion purposes, while a second portion of the preheated air is returned through vertical passages in the end of the housing to a pair of lower plenums and then introduced into the lower end of the combustion chamber for primary combustion purposes. The incinerator also has an improved feed assembly for feeding waste material to the combustion chamber, which includes a hopper, a triple hydraulic cylinder and a ram movable within the hopper. An ash removal rake is incorporated to remove ash from the lower portion of the combustion chamber. The rake is an open bottom casing which fills as the rake moves into the chamber. A door is then closed as the rake is withdrawn from the chamber, thus carrying a quantity of ash out of the chamber.

9 Claims, 19 Drawing Figures

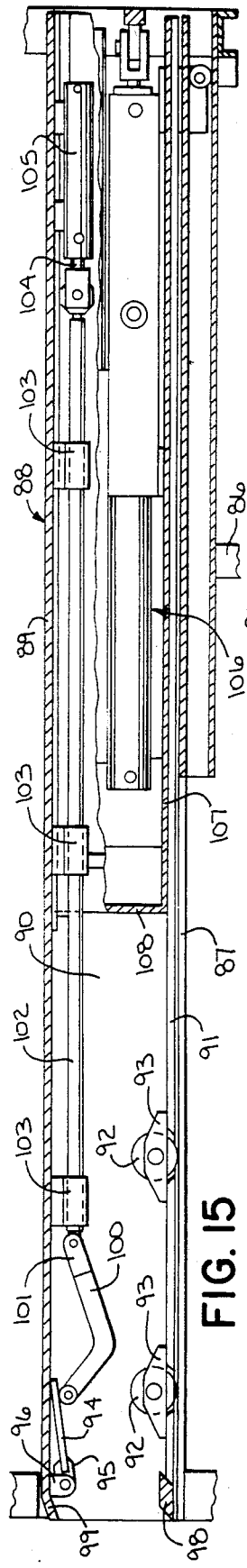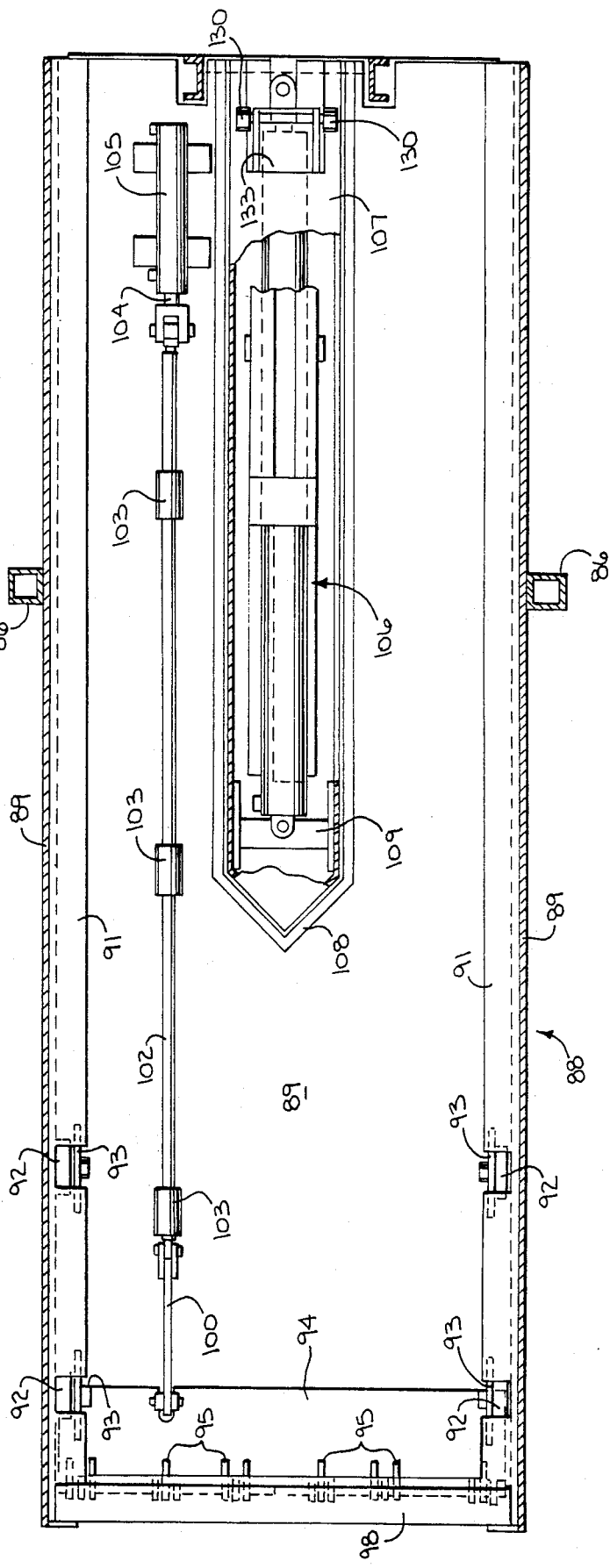
FIG. 15
FIG. 16

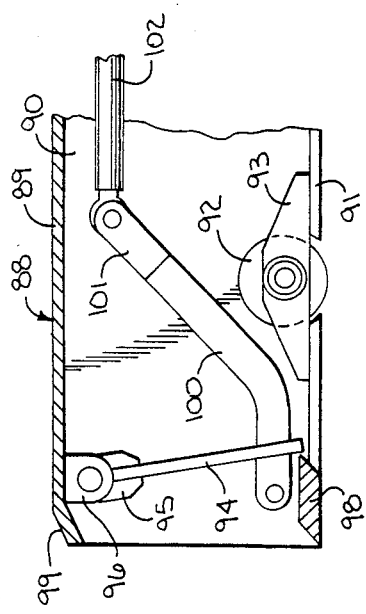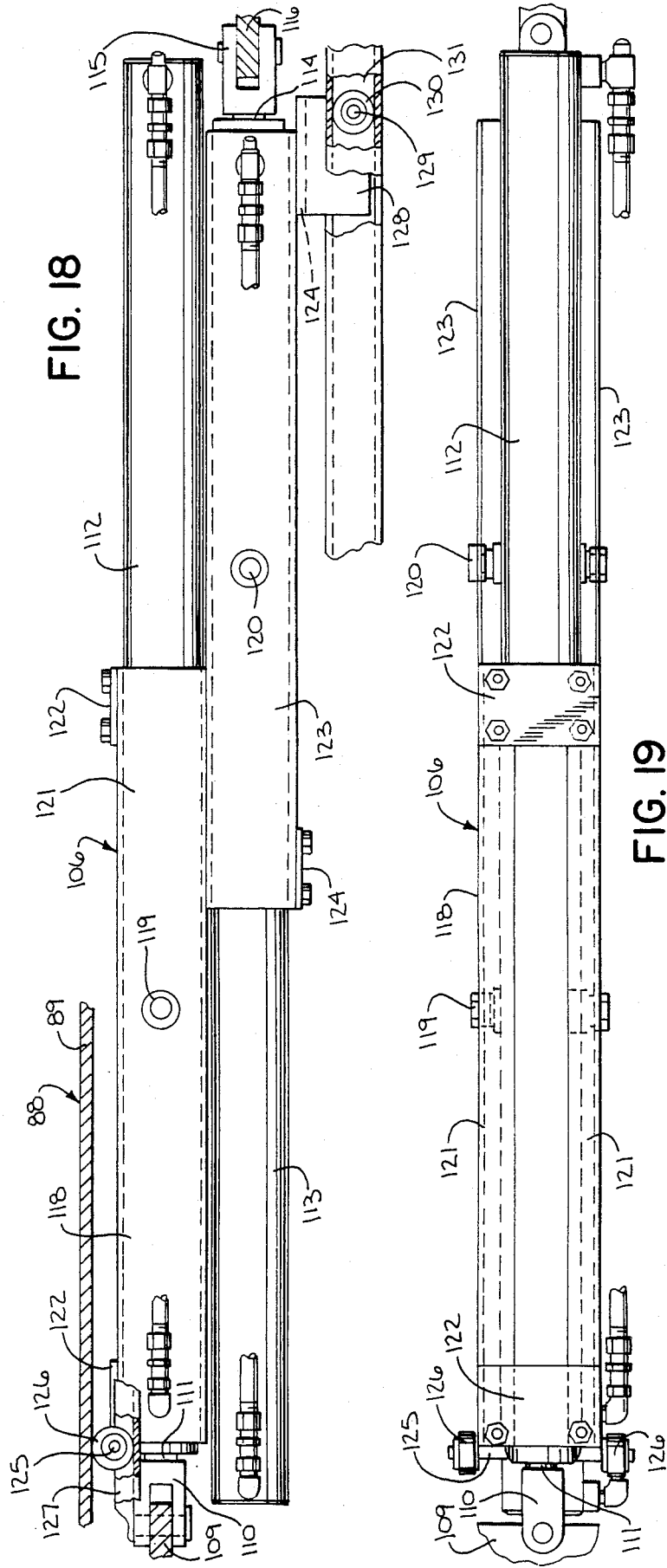

INCINERATOR

BACKGROUND OF THE INVENTION

In the conventional industrial-type incinerator for burning waste material, air is introduced into the lower end of the combustion chamber for primary combustion purposes, and frequently, secondary air is introduced into the stack to burn the waste gases of combustion in a secondary combustion zone. To conserve energy, the air being introduced to the incinerator can be preheated by passing the incoming air in heat transfer relation with heated surfaces of the incinerator.

With the use of large industrial-type incinerators, tremendous quantities of heat are generated. In some installations, the incinerator may be located within a building or other enclosed area so that it is desirable to cool the incinerator to prevent the surrounding area from being overheated.

Ash removal is a problem encountered in incineration processes. In large, municipal-type incinerators, movable grates are frequently utilized which will agitate the ash and cause the ash to drop through the grates to a collection area. However, industrial-type incinerators, grates are not utilized and many incinerators of this type require periodic manual removal of the ash, requiring a shutdown of the incinerator during periods of ash removal.

Some industrial incinerators employ an automatic ash removal system, such as that disclosed in U.S. Pat. No. 4,074,638. In the aforementioned patent, a generally cylindrical arm, which is normally located outside of a combustion chamber, is periodically moved across the chamber to agitate the ash and push a quantity of ash into a collection site at the opposite side of the combustion chamber.

SUMMARY OF THE INVENTION

The invention is directed to an incinerator having an improved air pre-heating system, along with a more efficient waste feeding assembly and an improved ash removal system.

In accordance with the invention, the incinerator includes an outer steel housing having a refractory lining that defines a combustion chamber. A series of channels are welded to the inner surface of the housing and provide a group of vertical air flow passages. The lower ends of the passages are open to the atmosphere, while the upper ends of the passages communicate with a plenum located at the upper end of the housing. The plenum is connected to the suction side of a blower, and the blower acts to draw air upwardly through the passages to pre-heat the air while simultaneously maintaining the outer housing at a moderate temperature.

A portion of the preheated air is delivered by the blower to the stack to be used for secondary combustion purposes, while a second portion of the preheated air is returned through a passage in the end of the housing to a pair of lower plenums, and the preheated air is then introduced from the lower plenums into the lower end of the combustion chamber for primary combustion of the waste material.

With the preheating system of the invention the preheated air is used not only for secondary combustion purposes, but is also delivered to the combustion chamber for primary combustion purposes. The pre-heating system, by passing the cool incoming air upwardly along the inner surface of the outer housing, serves to cool the outer housing and maintain the housing at a moderate temperature.

The invention also includes an improved feed assembly for automatically feeding waste material to the combustion chamber. The feed assembly includes a hopper located adjacent the incinerator and a ram is movable within the hopper to push a quantity of waste material into the combustion chamber. The ram is operated by a unique triple hydraulic cylinder unit which provides a more compact and efficient operating mechanism.

As another aspect of the invention, an ash removal rake is incorporated with the incinerator to periodically remove quantities of ash from the combustion chamber. The rake comprises a generally rectangular, open-bottom casing which is mounted beneath the feed assembly and is movable from an inoperative position located outside of the combustion chamber to an operative position within the combustion chamber.

The rake is moved into the combustion chamber by a hydraulic cylinder unit, and as the rake moves across the floor, a hydraulic cylinder will pivot a door, located at the forward end of the casing, inwardly to permit the ash to enter and fill the casing. The door is moved to the closed position, and then withdrawn from the combustion chamber. As the rake is moved to its inoperative position outside of the incinerator, the ash will fall from the open bottom of the casing to a suitable disposal site.

The ash removing rake enables substantial quantities of ash to be periodically withdrawn from the combustion chamber without the necessity of shutting down the incineration operation.

Other objects and advantages will appear in the course of the following description.

DESCRIPTION OF THE DRAWINGS

The drawings illustrate the best mode presently contemplated of carrying out the invention.

In the drawings:

FIG. 15 is a vertical section of the ash rake with the door in the open position;

FIG. 16 is a bottom view of the ash rake;

FIG. 17 is an enlarged fragmentary vertical section showing the door of the ash rake in the closed position and the rake being withdrawn from the ash pit;

FIG. 18 is a side elevation of the double cylinder unit for operating the ash rake; and FIG. 19 is a top view of the structure of FIG. 18.

DESCRIPTION OF THE ILLUSTRATED EMBODIMENT

Figure 1:
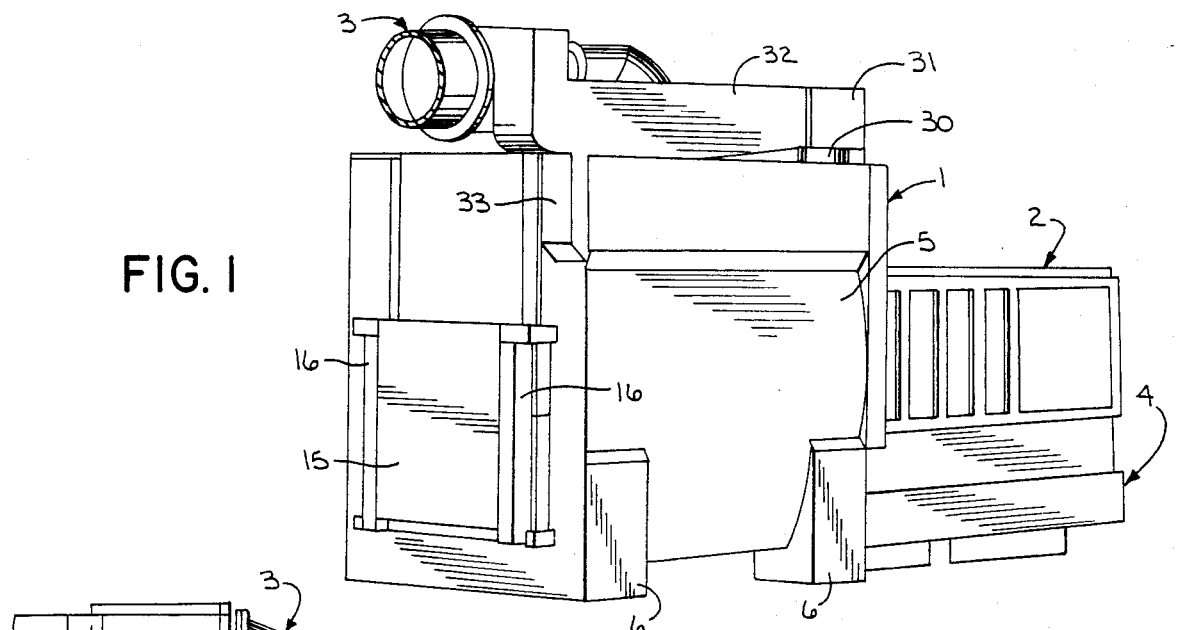
FIG. 1 is a perspective view of the incinerator of the invention.

FIG. 1 illustrates an incinerator 1 for burning waste material. The waste material is fed to the incinerator by a feed assembly 2 and the waste products of combustion are discharged from the incinerator through stack 3. An ash removal assembly 4 is located beneath the feed assembly and serves to periodically remove ash from the incinerator.

Figure 2:
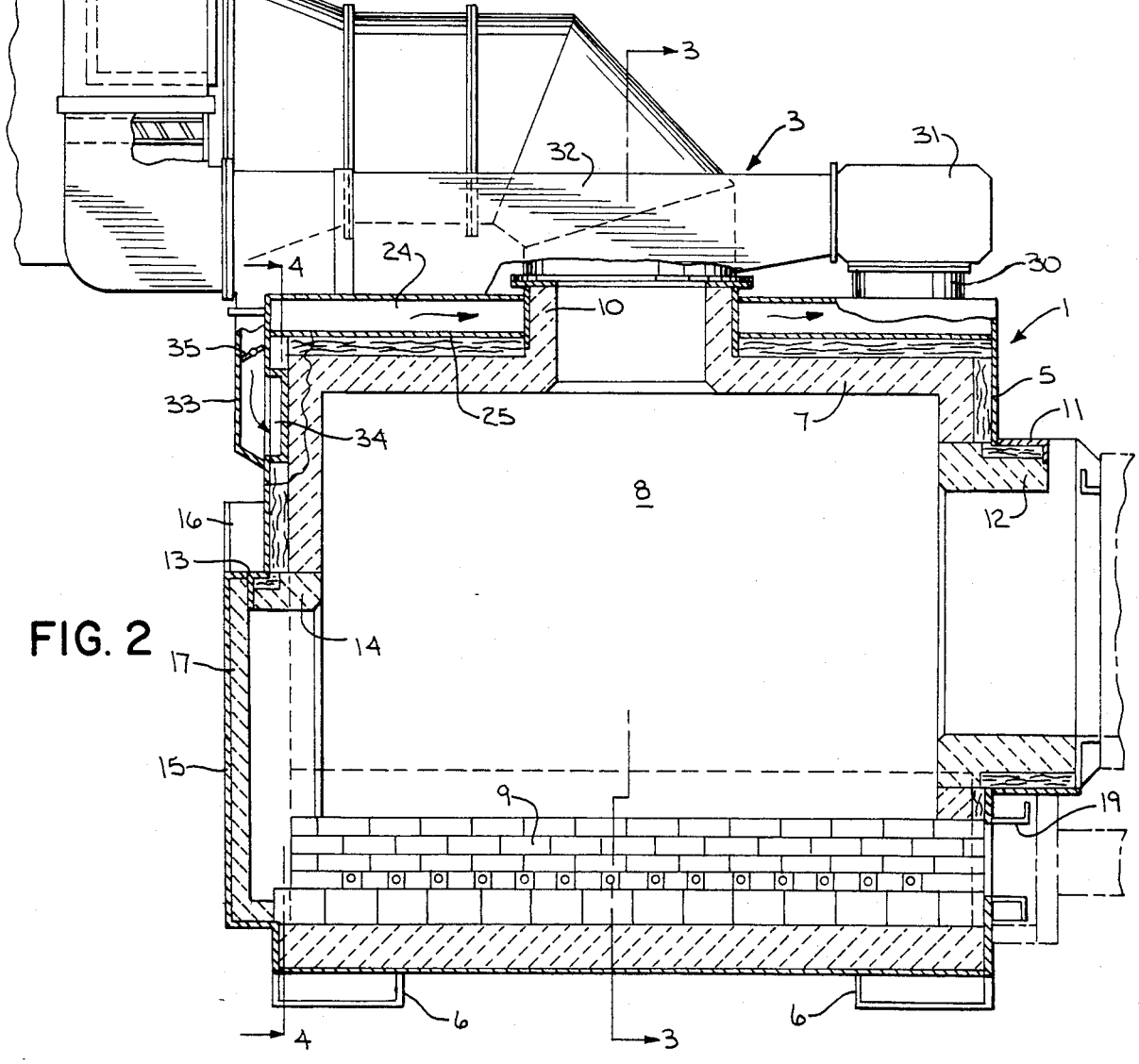
FIG. 2 is a vertical section of the incinerator.

As illustrated in FIG. 2, the incinerator includes an outer steel shell 5, which is supported from the ground or foundation by legs 6. A layer of refractory material 7 is applied to the inner surface of shell 5 and defines a combustion chamber 8. The lower end of combustion chamber 8 constitutes an ash pit 9, while the upper end of the combustion chamber is provided with an outlet 10 that communicates with stack 3.

To feed waste material to the combustion chamber, shell 5 is provided with a generally rectangular feed inlet 11 which is lined with a refractory material 12. The opposite end of shell 5 is formed with a rectangular access opening 13 lined with refractory material 14. A door 15, best shown in FIG. 1, is adapted to close off access opening 13, and is movable on vertical guides 16. The inner surface of door 15 is also lined with a refractory material 17. A conventional fuel burner 18 is mounted in an opening in shell 5 and is employed to initially ignite the combustible waste material in combustion chamber 8. When the waste material is burning the operation of the burner can be discontinued. To permit the removal of ash and non-combustible material, shell 5 is provided with an ash outlet 19 that communicates with ash pit 9.

Air Pre-Heating System

Figures 3, 6:
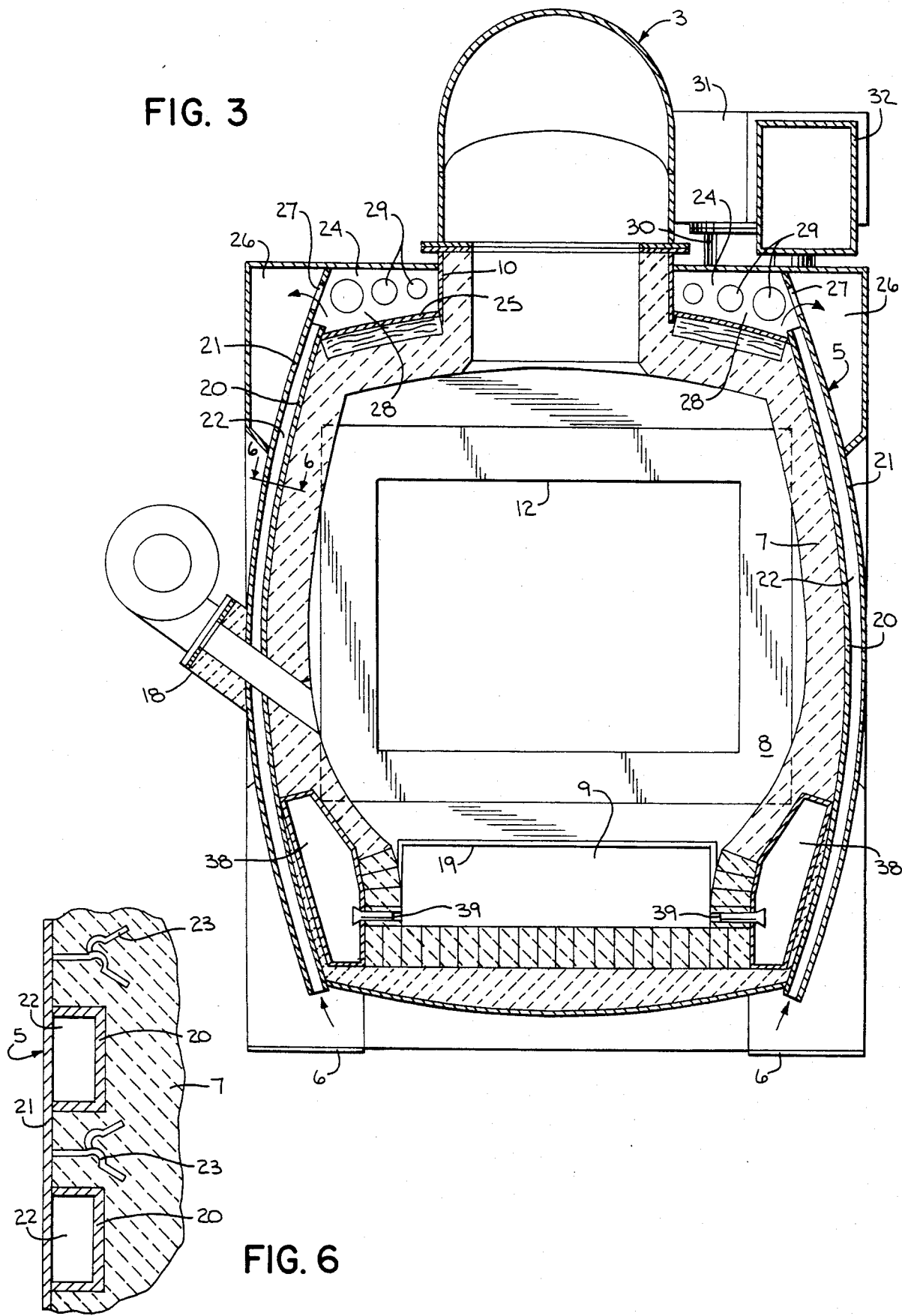
FIG. 3 is a transverse section taken along line 3—3 of FIG. 2.
FIG. 6 is a section taken along line 6—6 of FIG. 3 and showing the vertical air flow passages.

An air preheating system is incorporated in the incinerator in which air being supplied to the combustion chamber 8, as well as air being supplied to the stack 3 for secondary combustion purposes, is preheated. The preheating system includes a plurality of channels 20 having their side flanges welded to the inner surface of side walls 21 of shell 5. Channels 20 in combination with side walls 21 define a series of vertically extending air flow passages 22, as best shown in FIG. 6. The channels 20 also serve to reinforce the outer shell 5, and by spacing the channels apart, anchors 23 for the refractory lining 7 can be attached directly to the shell.

The lower ends of passages 22 are open to the atmosphere, while the upper ends of the passages communicate with upper chamber 24 that surrounds the outlet 10. Chamber 24 is defined by the upper surface of shell 5 and an interior upper wall 25 which is spaced beneath the upper surface of the shell. Chamber 24 communicates with a pair of upper plenums 26 via openings 27, so that air moving upwardly through the passages 22 will be routed through chamber 24 to plenums 26. As shown in FIG. 3, plenums 26 extend along the upper sides of shell 5.

As best shown in FIG. 3, a series of reinforcing webs 28 are welded within the chamber 24 and are provided with holes 29, so that air can flow freely through chamber 24.

As best illustrated in FIG. 2, chamber 24 is connected through an outlet conduit 30 to the suction side of blower 31 which is mounted on the upper surface of shell 5. Blower 31 acts to draw air upwardly through passages 22 to pre-heat the air. In addition the flow of incoming air through passages 22 also cools the outer shell and maintains the outer shell 5 at a moderate temperature.

The pre-heated air being discharged by blower 31 is conducted through a duct 32 extending along the top of shell 5 and the air from duct 32 will be fed to the stack 3 for combusting the waste gases of combustion in a secondary combustion zone in the stack.

Figure 4:
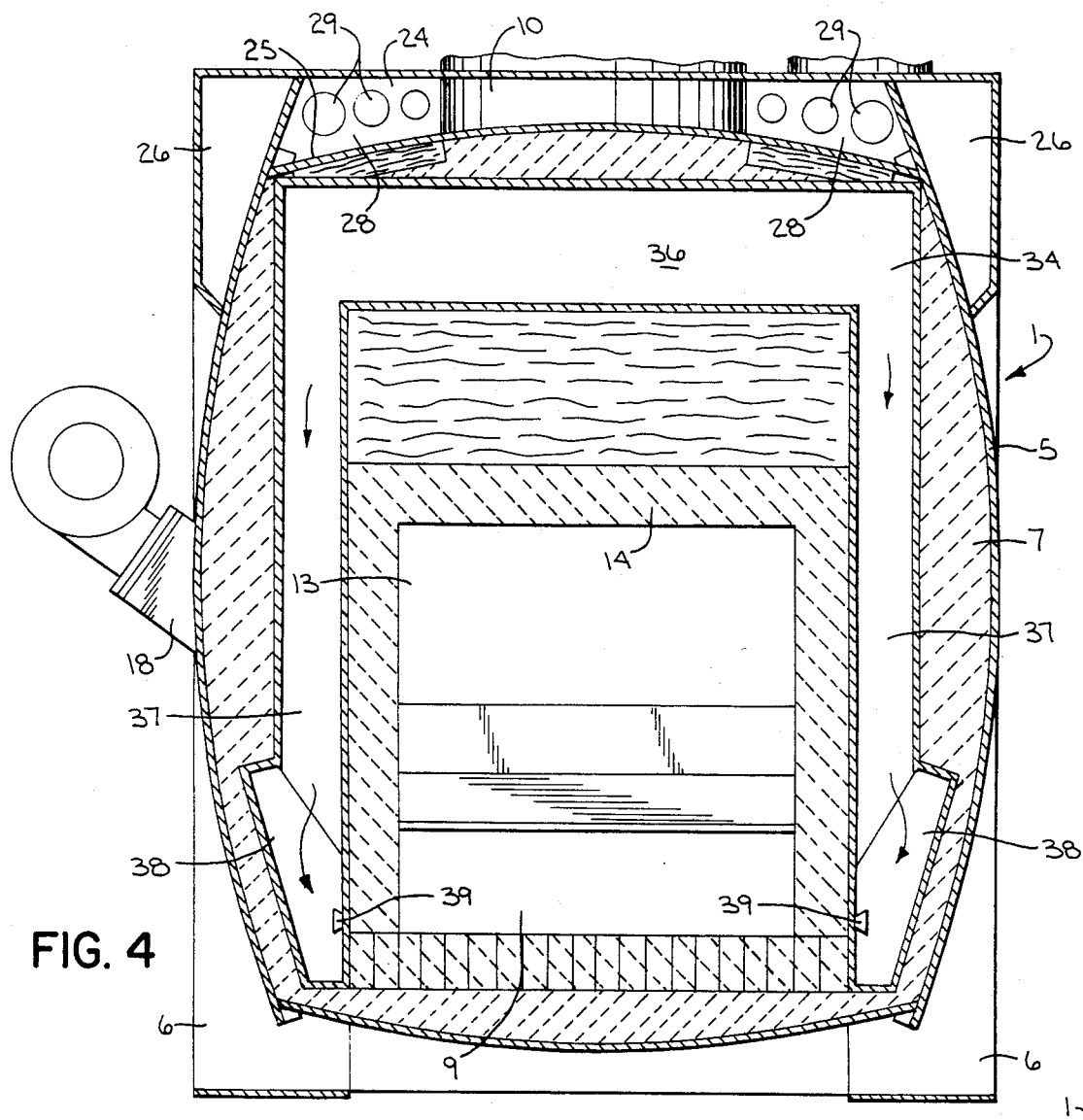
FIG. 4 is a section taken along line 4—4 of FIG. 2.
Figure 5:
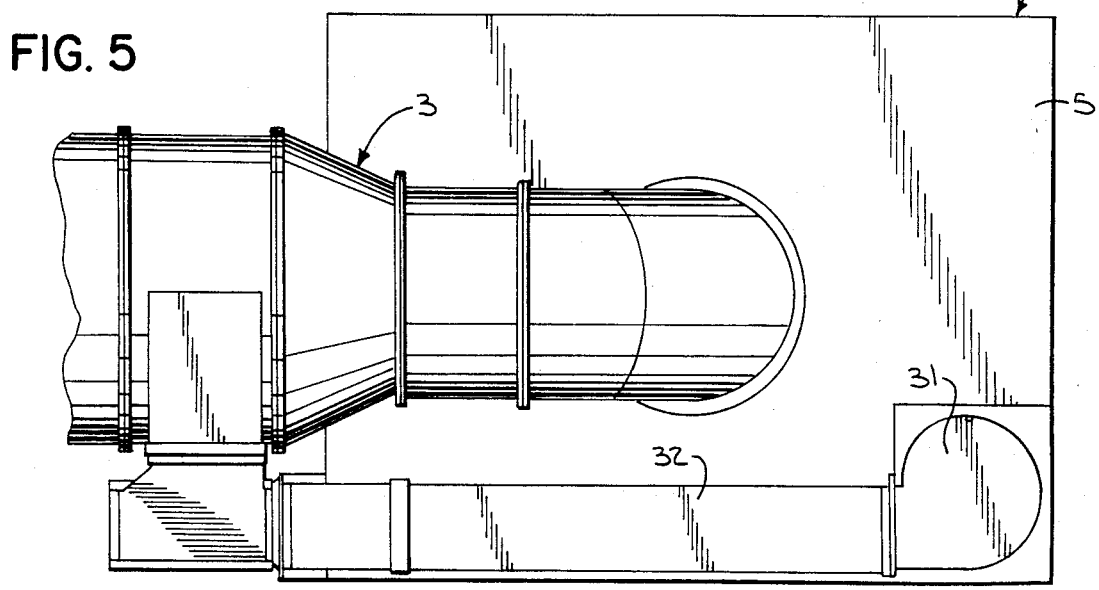
FIG. 5 is a top view of the incinerator.
Figure 7:
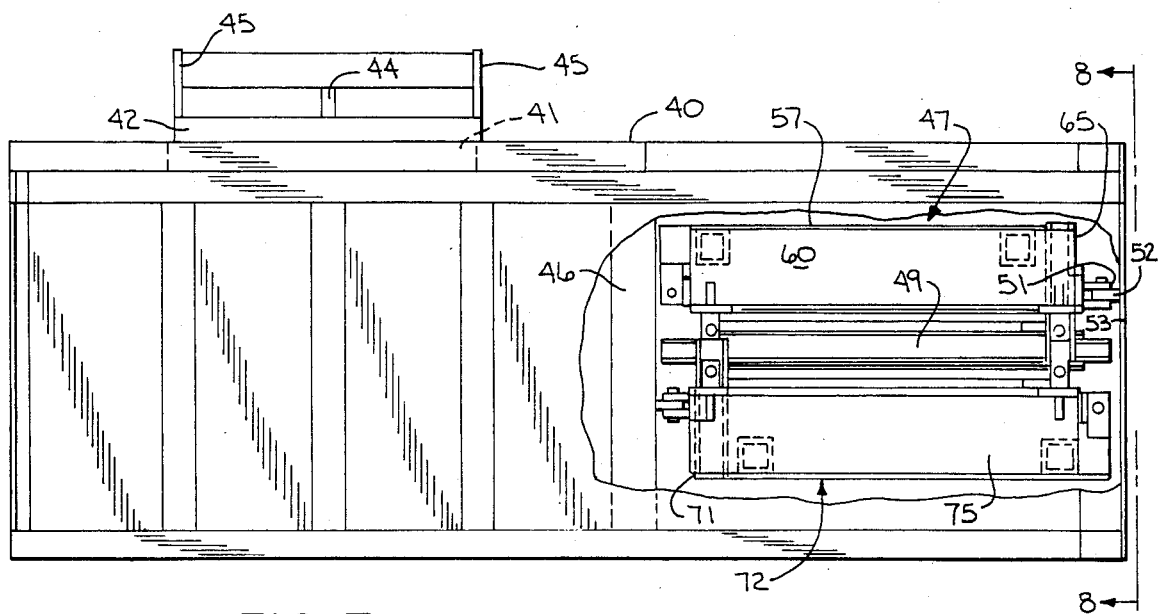
FIG. 7 is a side elevation of the feed assembly with parts broken away in section.
Figure 8:
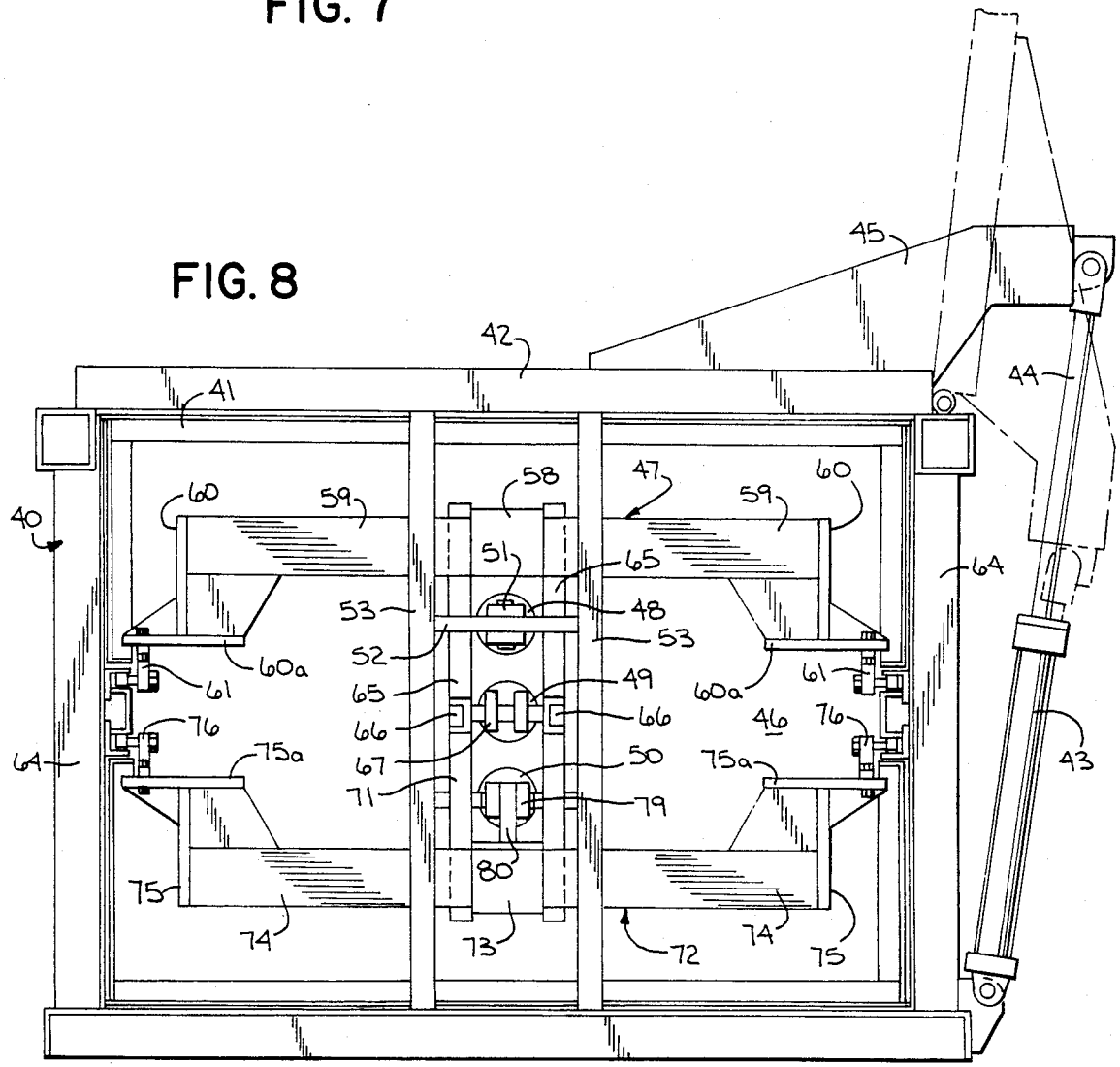
FIG. 8 is an end view taken along line 8—8 of FIG. 7.

In accordance with the invention, a portion of the preheated air being discharged by blower 31 is delivered through a return duct 33 into a generally U-shaped passage 34 located adjacent one end of shell 5. Flow within the return duct 33 is controlled by a conventional damper 35. As best illustrated in FIG. 4, the passage 34 includes an upper header 36 and a pair of connecting legs 37 which extend downwardly on either side of access opening 13. The lower ends of legs 37 are connected to lower plenums 38, each of which extends longitudinally along the lower end of the combustion chamber. A plurality of air tubes 39 connect the plenums 38 and the lower end of the combustion chamber, as best shown in FIG. 3.

With this air pre-heating system, air from the atmosphere is drawn by blower 31 into the lower ends of vertical passages 22, and as the air flows upwardly within the passages it is preheated and also serves to cool the outer shell 5. A portion of the preheated air being discharged from blower 31 is directed to the stack 3 for secondary combustion purposes, while a second portion of the preheated air is directed downwardly through duct 33, through passage 34 to lower plenums 38 where it is introduced through air tubes 39 into the combustion chamber for primary combustion purposes.

Thus, the preheated air is used both for primary and secondary combustion purposes, as well as cooling the outer shell of the incinerator. As the outer shell is cooled by the air flow, the amount of refractory material can be reduced without increasing the maximum surface temperature of the incinerator.

Feed Assembly

The feed assembly 2 includes a generally rectangular hopper 40 having a feed opening 41 in its upper surface which is normally enclosed by a pivotable cover 42. Cover 42 can be moved between the open and closed positions by a hydraulic cylinder 43 having its lower end pivotally connected to the hopper. Ram 44 which is slidable in cylinder 43 is connected to a pair of arms 45 which are welded to the upper surface of cover 42. By withdrawing the ram 44, the cover can be pivoted to the open position, while extending the ram will move the cover to the closed position.

Figure 9:
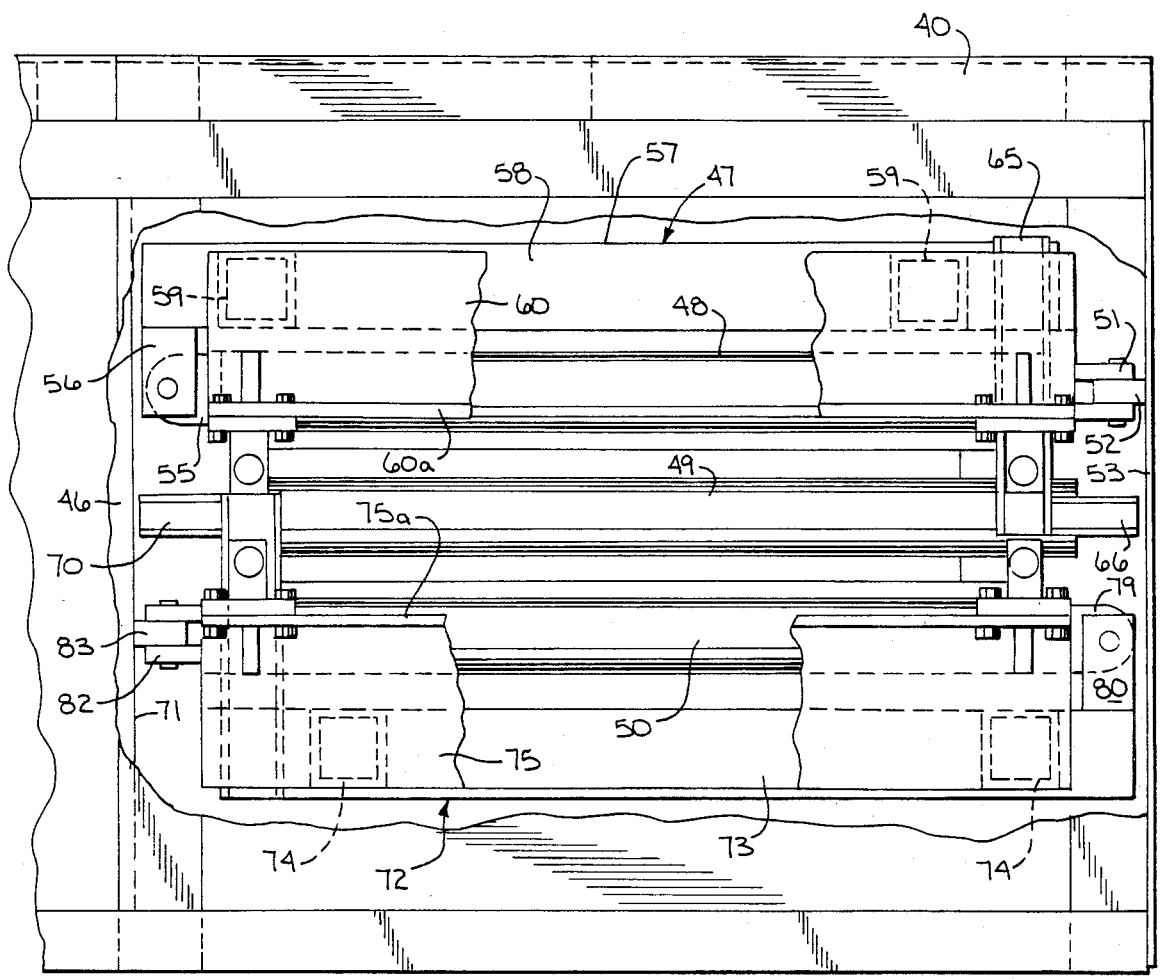
FIG. 9 is an enlarged side elevation with parts broken away showing the triple cylinder unit for the feed assembly.

The waste material which is fed into the hopper through the feed opening 41 is adapted to be pushed through the feed inlet 11 into the combustion chamber by a ram 46 having a generally rectangular configuration to compliment the hopper. Ram 46 is moved in a reciprocating path by a triple hydraulic cylinder unit indicated generally by 47. Cylinder unit 47 includes an upper hydraulic cylinder 48, an intermediate cylinder 49 and a lower cylinder 50. As best shown in FIG. 9, one end of upper cylinder 48 is pivotally connected to the fixed hopper 40. In this regard, a clevis 51 on the end of cylinder 48 is pivotally connected to a bar 52 that extends between vertical posts 53 of hopper 40. Piston rod 54, which is slidable within cylinder 48, carries a clevis 55 which is pivoted to a lug 56 that hangs downwardly from one end of upper carriage 57.

Figure 11:
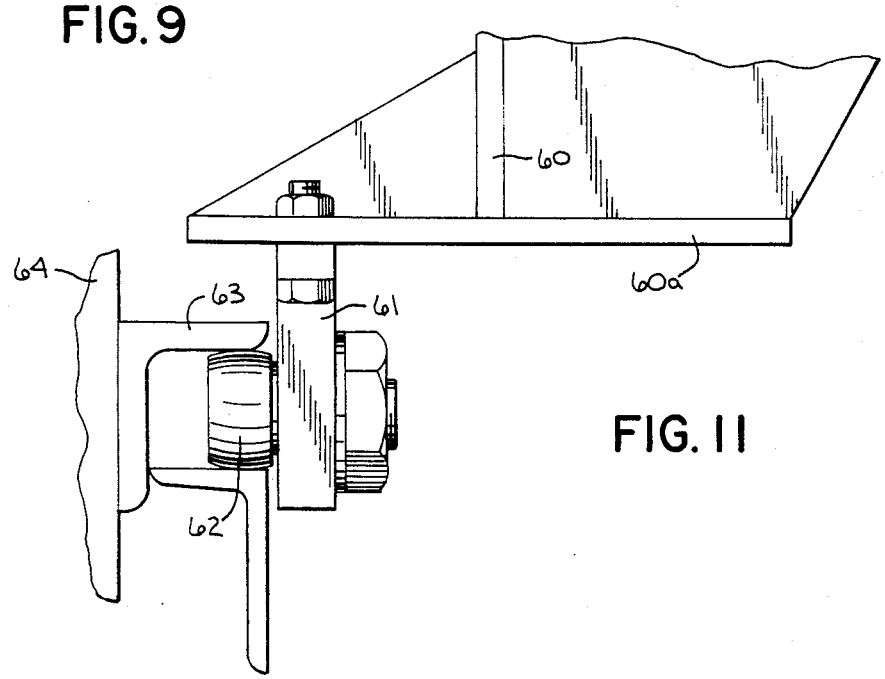
FIG. 11 is an enlarged fragmentary vertical section showing the guide structure for the carriages.
Figure 10:
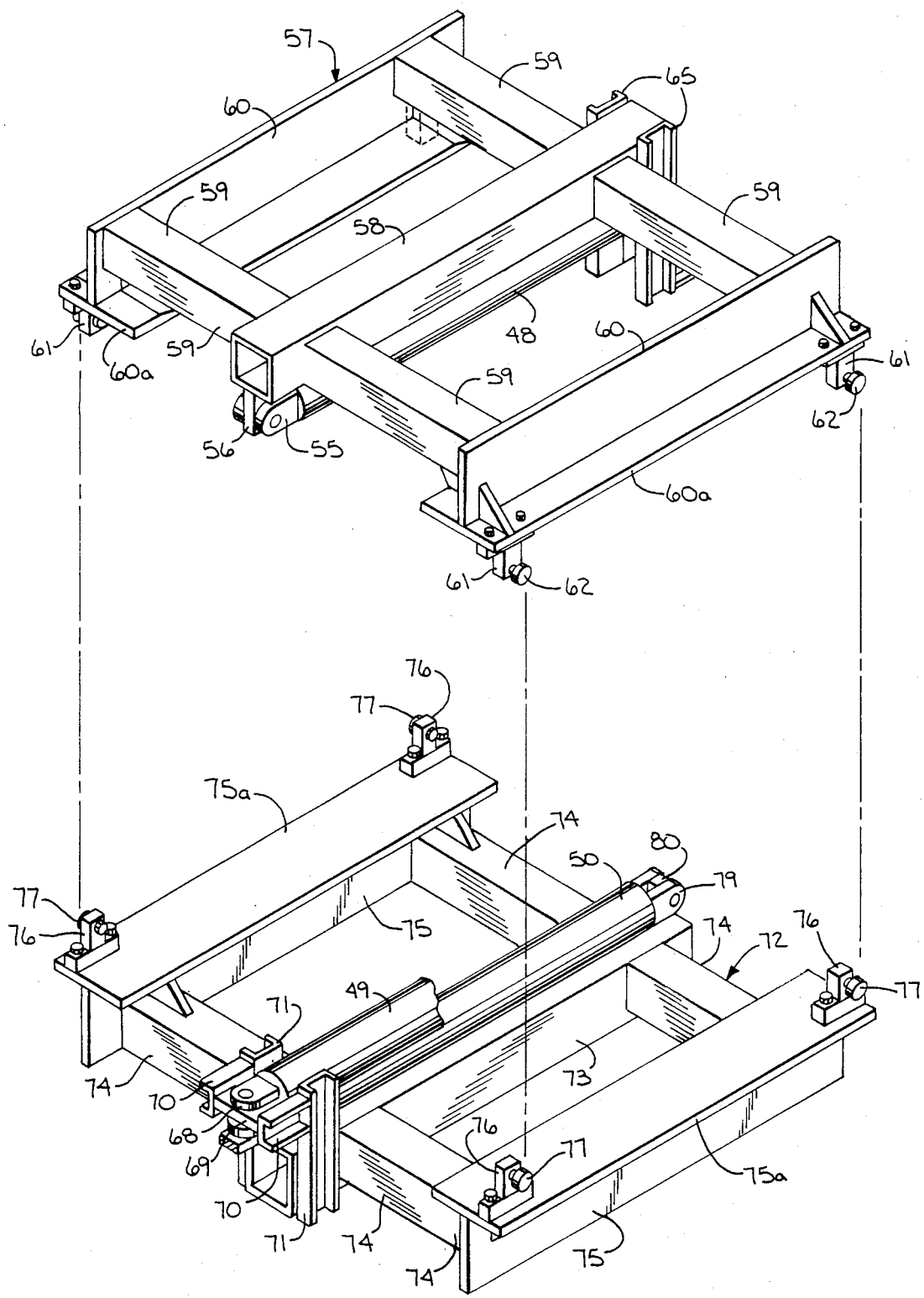
FIG. 10 is a perspective view of the carriages of the cylinder unit.
Figure 12:
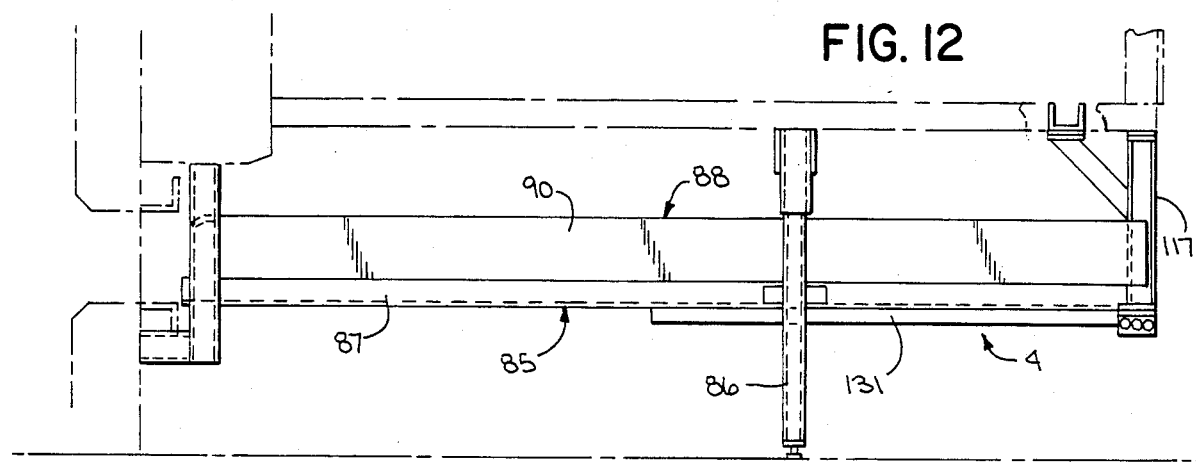
FIG. 12 is a side elevation of the ash removal unit with the ash rake in the storage position.

As best illustrated in FIG. 10, carriage 57 is composed of a longitudinal beam 58 having a generally rectangular cross-section and cross-arms 59 extend laterally from longitudinal beam 58 at the ends of the carriage. Vertical plates 60 are secured to the outer ends of the corresponding cross-arms 59 and horizontal plates 60a are connected to the lower edge of vertical plates 60. A pair of brackets 61 are mounted on the lower surface of each plate 60a, as best shown in FIG. 11, and brackets 61 carry rollers 62 that are mounted for movement in guide track 63 on side walls 64 of hopper 40. With this construction, as hydraulic fluid is introduced into cylinder 48 to extend the piston rod 54, the piston rod, being attached directly to the carriage 57, will move the carriage longitudinally within the hopper 40.

As illustrated in FIGS. 9 and 10, a pair of supports 65 are mounted on the sides of longitudinal beam 58 adjacent the end posts 53. The lower ends of supports 65 carry horizontal members 66 and a cross pin is connected between members 66 and is pivotally connected to a clevis 67 on the end of piston rod of intermediate cylinder 49. With this construction, movement of carriage 57 will correspondingly move the intermediate cylinder 49 in the same direction.

Figure 13:
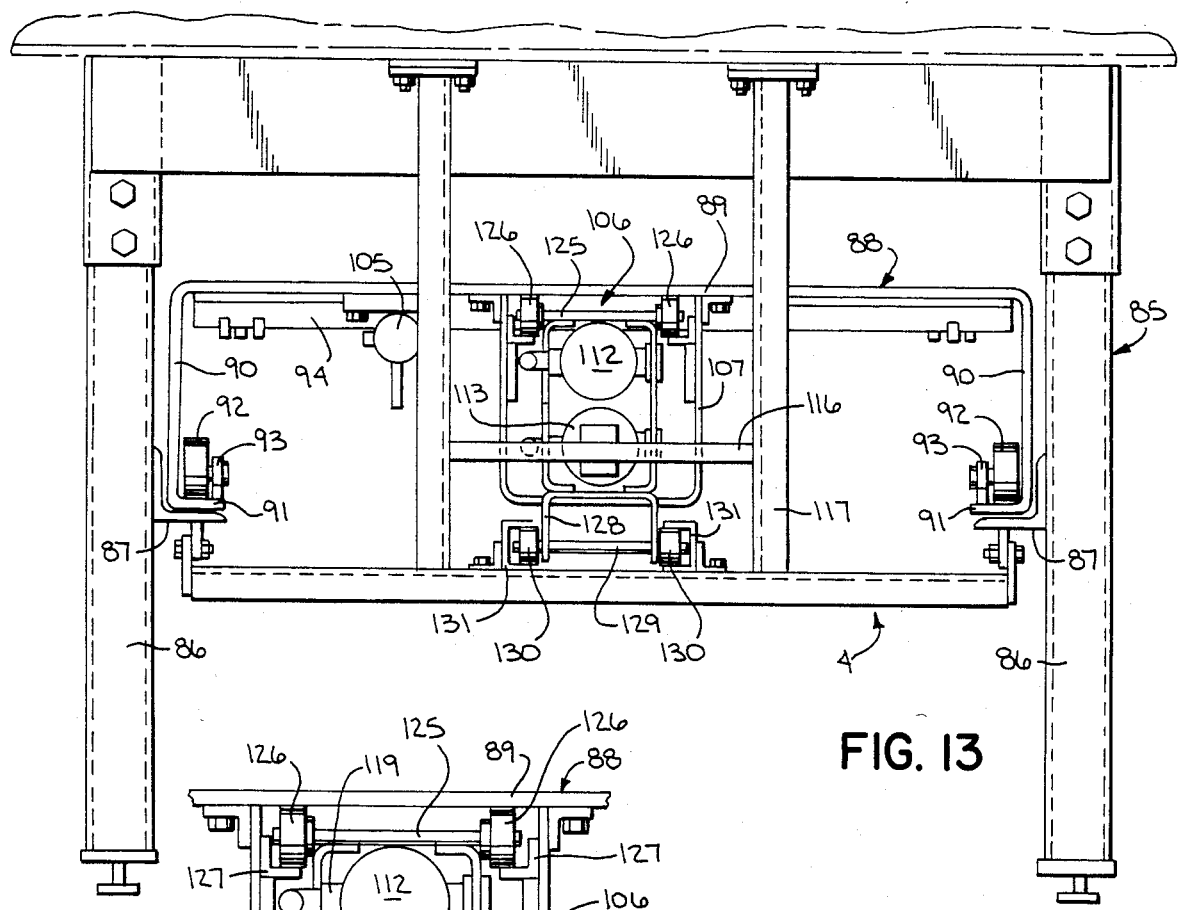
FIG. 13 is an end view of the structure of FIG. 12.

The opposite end of intermediate cylinder 49 is provided with a clevis 68 which is pivotally connected to a cross member 69 carried by horizontal members 70 that in turn are secured to the upper ends of spaced upstanding supports 71 on the end of lower carriage 72. Carriage 72, as shown in FIG. 10, is similar in construction to carriage 59 and is composed of a longitudinal beam 73 and cross arms 74 extend laterally from longitudinal beam 73 at the ends of carriage 69. As shown in FIG. 13, supports 71 are mounted on the sides of beam 73 and project upwardly therefrom.

To mount the carriage 69 for movement relative to the hopper, vertical plates 75 are secured to the outer ends of corresponding arms 74 and a horizontal plate 75a is attached to the upper edge of each vertical plate 75. A pair of brackets 76 are mounted on each horizontal plate 75a and carry rollers 77 that ride on guide tracks 78 formed in side wall 64.

One end of lower cylinder 50 is provided with a clevis 79 which is pivotally connected to an upstanding lug 80 on carriage 72. A piston rod, which is slidable in the lower cylinder 50, is provided with a clevis 82 which is pivotally connected to a lug 83 on the ram 46.

The three cylinders 48–50 can be actuated simultaneously or in series to move the ram 46 through the hopper and deliver the waste material to the combustion chamber. The use of the three cylinders substantially reduces the overall length of the hydraulic cylinder unit and makes a more compact system which reduces space requirements. The interconnecting carriages 59 and 72 provide a smooth and positive operation for movement of ram 46.

Ash Removal Unit

The ash removal unit 4 comprises a frame 85 which is connected to incinerator 1 and is positioned beneath the feed assembly 2. Frame 85 includes a pair of legs 86 which support the frame on the ground and angle-shaped guide tracks 87 are secured to the inner surface of legs 86 and extend the full length of the frame. A generally rectangular open-bottom rake 88 is adapted to slide on the tracks 87 and is movable between an outer standby position in which the rake is located out of the combustion chamber and an inner operative position in which the rake is located within the ash pit of the combustion chamber. As best illustrated in FIG. 13, the ash rake 88 includes a generally flat top surface 89 and a pair of side walls 90 which extend downwardly from top 89 and terminate in inwardly extending flanges 91 that ride on tracks 87.

A pair of guide rollers 92 are journalled on brackets 93 attached to each flange 91 and are located at the inner end of the rake. Rollers 92 facilitate movement of the rake on track 87 from its outer to inner operative position.

Located at the inner or forward end of rake 88 is a pivotable door 94. A series of lugs 95 are secured to the upper edge of door 94 and are pivotally connected to lugs 96 that depend from top wall 89 by hinge pin 97. Door 94 is pivotable from a generally vertical closed position, as shown in FIG. 18, to an open position where the door is located horizontally beneath top wall 89, as illustrated in FIG. 15.

Mounted across the flanges 91 at the forward end of rake 88, as best shown in FIG. 17, is an anticlimb bar 98 having a downwardly inclined forward surface. The bar 98 acts to prevent the forward end of the rake from climbing upwardly as the rake is moved across the ash pit in the event the rake should encounter large clinkers or other large non-combusted material.

As illustrated in FIGS. 15 and 17, the forward edge to top wall 89 is bent downwardly as indicated by 99 and the downturned edge 99 protects the door from clinkers or ash entering the open end of the rake as the rake is moved across the ash pit with the door in its upper horizontal storage position.

Door 94 can be moved between its open and closed positions by an arm 100 which is pivotally connected to the lower portion of the door. The rear end of arm 100 is connected by a pair of coupling plates 101 to the forward end of a rod 102 which is mounted for sliding movement within bushings 103 attached to top wall 89. The rear end of rod 102 is connected to piston rod 104 which is mounted for sliding movement within cylinder 105 attached to upper wall 89.

The door 94 is in its open position as the rake is moved forward into the ash pit. In this storage location, the door will be located against the top wall 89 and will be protected by the downturned edge 99, so that ash and clinkers entering the open end of the rake will not damage the door.

After the rake has moved partially or fully across the ash pit to collect a load of ash, door 94 is then moved to its closed position by operation of cylinder 105 simultaneously with rear movement of rake 88. This action of cylinder 105 in combination with rear movement of the rake 88 toward its inoperative position will move door 94 to its closed position to thereby prevent the quantity of ash contained within rake 88 from passing out of the open end as the rake is withdrawn.

As the rake 88 has an open bottom, movement of the rake to its inoperative position, outside of the incinerator, will cause the ash to fall from the rake to a conveyor, pit, or other storage site located beneath the frame 85.

Rake 88 is moved between its outer position and its inner operative position by a double cylinder unit indicated generally by 106. The cylinder unit includes a trough 107 having a U-shaped cross section which is secured to the underside of top wall 89 and extends slightly more than one-half the length of the rake 88 from the rear end of the rake to a position slightly beyond its mid-point. As best illustrated in FIG. 16, the forward end of trough 107 is tapered to a generally sharp tip 108.

Mounted transversly across trough 107 is a cross bar 109 and a clevis 110 attached to the outer end of a piston rod 111 of cylinder 112 is connected to the cross bar.

Figure 14:
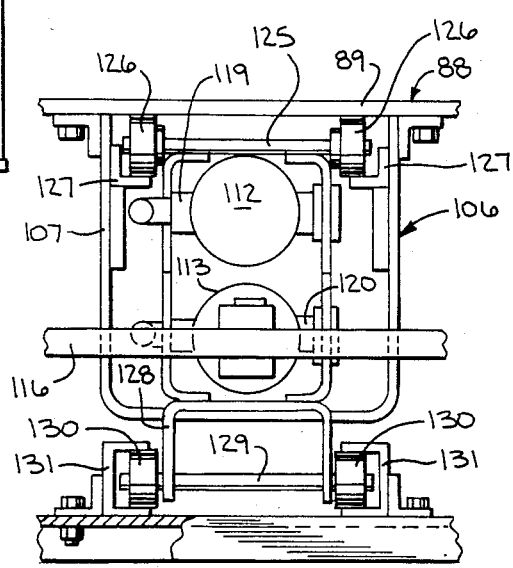
FIG. 14 is an enlarged fragmentary end view showing the ash rake and the double cylinder unit.

As shown in FIGS. 14 and 18, a second cylinder 113 is mounted beneath cylinder 112 and piston rod 114, that is slidable in cylinder 113, carries clevis 115, which is connected to the horizontal cross bar 116 of an H-shaped frame section 117 located at the outer end of frame 85.

As best shown in FIGS. 18 and 19, a generally box-shaped frame 118 connects cylinder 112 and 113 together. Cylinder 112 is connected to frame 118 by horizontal trunion 119 and similarly cylinder 113 is connected to frame 118 by trunion 120. The pivotal connections provided by trunions 119 and 120 enables the cylinders 112 and 113 to tilt or pivot thus permitting the cylinders to maintain proper alignment.

The frame 118 includes a pair of angle-shaped side members 121 which border cylinder 112.

The upper edges of side members 121 are connected together by a pair of horizontal plates 122. Similarly, the lower cylinder 113 is enclosed by a pair of angle-shaped side members 124 and the lower edges of side members 123 are connected together by horizontal plates 124.

To guide the cylinder unit in movement, a horizontal shaft 125 is mounted at the forward end of the cylinder unit and is secured to the horizontal flanges of the side members 121 as well as to forward plate 122. The ends of shaft 125 carry wheels 126 which ride on tracks 127 of trough 107.

In addition, the rear end of the cylinder unit 106 is guided for movement by an assembly including a U-shaped bracket 128 which is secured to the rear end of the side members 123. Shaft 129 is mounted within the flanges of U-shaped member 128 and the ends of shaft 129 carry wheels 130 that slide in channel-shaped tracks 131 mounted on cross member 137 of the frame.

As best shown in FIG. 16, the rear end of the trough 107 is provided with a recess or cut-out 133, so that the rear wheels 130 can be moved within the confines of the trough.

As described, one end of the double cylinder unit 106 is connected to the fixed frame 85 while the opposite end of the cylinder unit is connected to cross bar 109 of rake 88. By actuating one or both of the cylinders 112 and 113, the rake 88 can be moved across the ash pit in the lower end of the combustion chamber to agitate the ash and to override a quantity of ash which is trapped within the housing of the rake. By moving the door 94 toward its closed position, along with rear movement of the rake, the ash will be trapped within the rake as the rake is moved rearwardly to the exterior of the incinerator. As the rake 88 is provided with an open bottom, the ash trapped within the rake will be discharged from the rake and downwardly through the frame 85 to a conveyor or other collection site.

The use of the double cylinder unit 106 reduces the overall length of the actuating mechanism and provides more precise movement for the rake.

Various modes of carrying out the invention are contemplated as being within the scope of the following claims particularly pointing out and distinctly claiming the subject matter which is regarded as the invention.

We claim:

1. An incinerator having a housing defining a combustion chamber in which waste material is to be burned, a stack connected to the upper portion of the combustion chamber for discharging waste gases of combustion, means comprising a plurality of vertically extending passages disposed along the inner surface of said housing, said passages each having an entrance end and an exit end, air being passed through said passages from the entrance end to the exit end to pre-heat said air, conduit means communicating with the exit ends of said passages for supplying pre-heated air through the stack for secondary combustion of combustible materials in said waste gases, and return conduit means communicating with the exit end of said passages for returning a second portion of the pre-heated air to the lower end of the combustion chamber for primary combustion purposes.

2. The incinerator of claim 1, and including blower means communicating with said passages for inducing a flow of air in said passages from the entrance end to the exit end.

3. The incinerator of claim 2, wherein the entrance end of the passages is located at the lower end of the combustion chamber and said blower means communicates with the exit end of said passages to draw air upwardly through said passages.

4. The incinerator of claim 1, wherein said return conduit means comprises at least one channel disposed within the housing and separate from said passages.

5. The incinerator of claim 4, wherein said housing is provided with a pair of opposed side walls and a pair of opposed end walls, said passages being disposed in at least one side wall of said housing and said channel disposed in at least one end wall.

6. The incinerator of claim 5, wherein said passages are disposed along both side walls of said housing, and said incinerator includes an upper plenum disposed at the upper end of the housing, the exit end of said passages disposed along both side walls communicating with said upper plenum.

7. The incinerator of claim 4, and including a lower plenum disposed within the housing and communicating with said channel, and a plurality of air tubes connecting the lower plenum with the lower end of the combustion chamber for supplying pre-heated air to the lower end of the combustion chamber.

8. The incinerator of claim 1, wherein said passage means includes a plurality of channel-shaped members, each having a web and a pair of side flanges, the flanges of each member being welded to the inner surface of said housing with the spaces between the respective webs and said housing defining said passages.

9. The incinerator of claim 8, wherein said channel-shaped members are spaced apart and said incinerator includes a refractory lining disposed around the combustion chamber, and a plurality of anchors secured to the housing between said channel-shaped members and embedded within said refractory lining.

* * * * *